United States Patent [19]

Marschke

[11] Patent Number: 5,076,311
[45] Date of Patent: Dec. 31, 1991

[54] DIRECTLY INSTALLED SHUT-OFF VALVE ASSEMBLY FOR FLOWING HIGH PRESSURE LINE

[75] Inventor: Carl R. Marschke, Phillips, Wis.

[73] Assignee: Marquip Inc., Phillips, Wis.

[21] Appl. No.: 697,398

[22] Filed: May 9, 1991

[51] Int. Cl.⁵ .............. B23B 41/08; B23B 47/18; F16L 41/04; F16L 55/12

[52] U.S. Cl. .................................. 137/15; 137/318; 138/89; 138/94; 138/97; 166/55.1; 166/285; 169/69; 408/30; 408/87; 408/130; 408/206

[58] Field of Search .............. 137/15, 315, 317, 318; 138/89, 94, 97; 166/55, 55.1, 285, 297; 169/69; 408/24, 30, 87, 117, 130, 204, 206, 207

[56] References Cited

U.S. PATENT DOCUMENTS

| | | | |
|---|---|---|---|
| 1,879,160 | 9/1932 | Fowzer | 138/94 |
| 2,000,381 | 5/1935 | Duffy | 166/90 |
| 2,840,166 | 6/1958 | Eckel et al. | 137/318 |
| 2,899,983 | 8/1959 | Farris | 137/318 |
| 3,164,040 | 1/1965 | Reynolds | 408/130 |
| 3,532,113 | 10/1970 | McKean | 137/318 |
| 3,603,387 | 9/1971 | Schoeffler | 137/318 |
| 3,650,547 | 3/1972 | Tickett | 137/318 |
| 3,693,715 | 9/1972 | Brown | 166/93 |
| 3,699,996 | 7/1972 | Nichols | 137/318 |
| 3,703,909 | 11/1972 | Erb | 137/318 |
| 3,717,202 | 2/1973 | Burrow | 166/95 |
| 3,905,718 | 9/1975 | Luckenbill et al. | 137/318 |
| 3,993,137 | 11/1976 | Hefetz | 169/69 |
| 4,108,194 | 8/1978 | Harrison et al. | 137/318 |
| 4,184,504 | 1/1980 | Carmichael et al. | 137/318 |
| 4,291,727 | 9/1981 | Yie et al. | 137/318 |
| 4,458,721 | 7/1984 | Yie et al. | 137/318 |
| 4,516,598 | 4/1985 | Stupak | 137/318 |
| 4,552,170 | 11/1985 | Margrave | 138/94 |
| 4,574,442 | 3/1986 | Dickinson et al. | 408/130 |
| 4,832,069 | 5/1989 | Gale et al. | 137/318 |

Primary Examiner—George L. Walton
Attorney, Agent, or Firm—Andrus, Sceales, Starke & Sawall

[57] ABSTRACT

An apparatus for installing a reopenable shut-off valve into a flowing high pressure pipe, such as the production pipe in an uncontrolled flowing well, utilizes a cylindrical outer saddle member attached around the production pipe and providing a housing for the drilling, finishing and plugging assembly. The saddle is welded directly to the pipe section or attached via an intermediate layer of epoxy to add rigidity and strength to the pipe section. A rotary drill is advanced completely through the surrounding saddle and the internal production pipe and is followed axially by a valve plug. Sealing engagement of the valve plug in the cut hole may be attained by expanding the plug with internal fluid pressure or by utilizing a tapered plug held in sealing engagement with the similarly tapered hole by the application of an axial sealing force. A method for accessing the production pipe at an underground location for attaching the pipe plugging apparatus a safe distance from the well head is also disclosed.

17 Claims, 4 Drawing Sheets

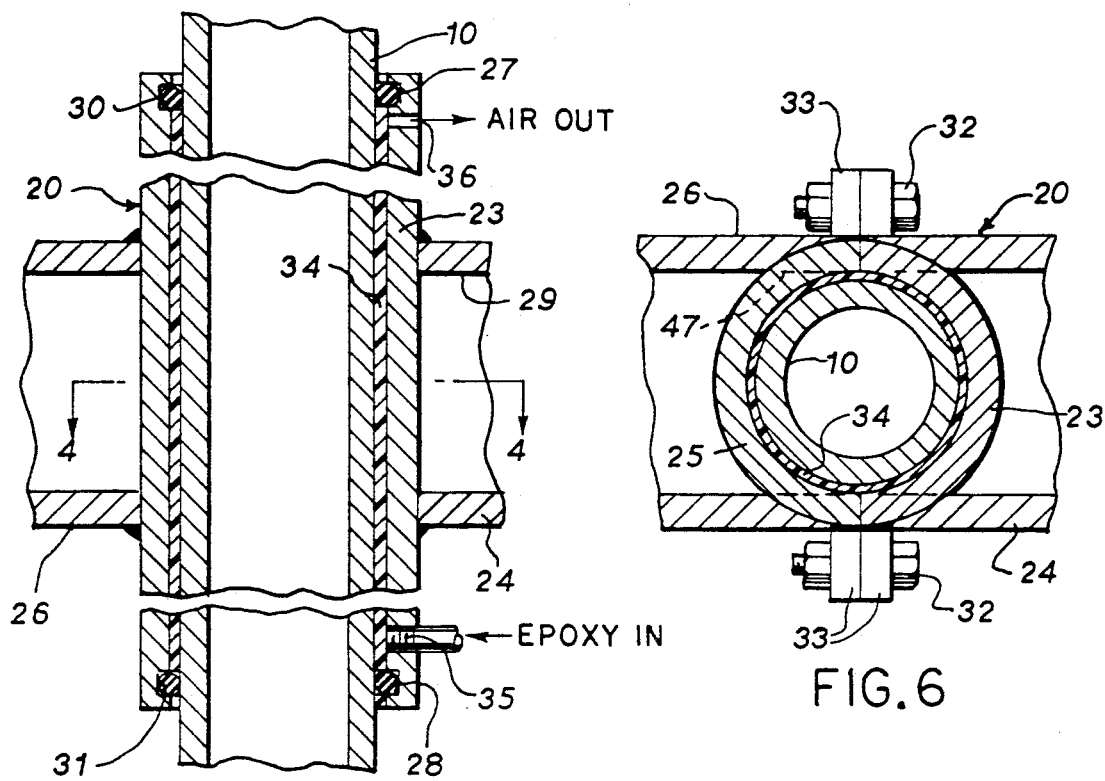
FIG. 5
FIG. 6
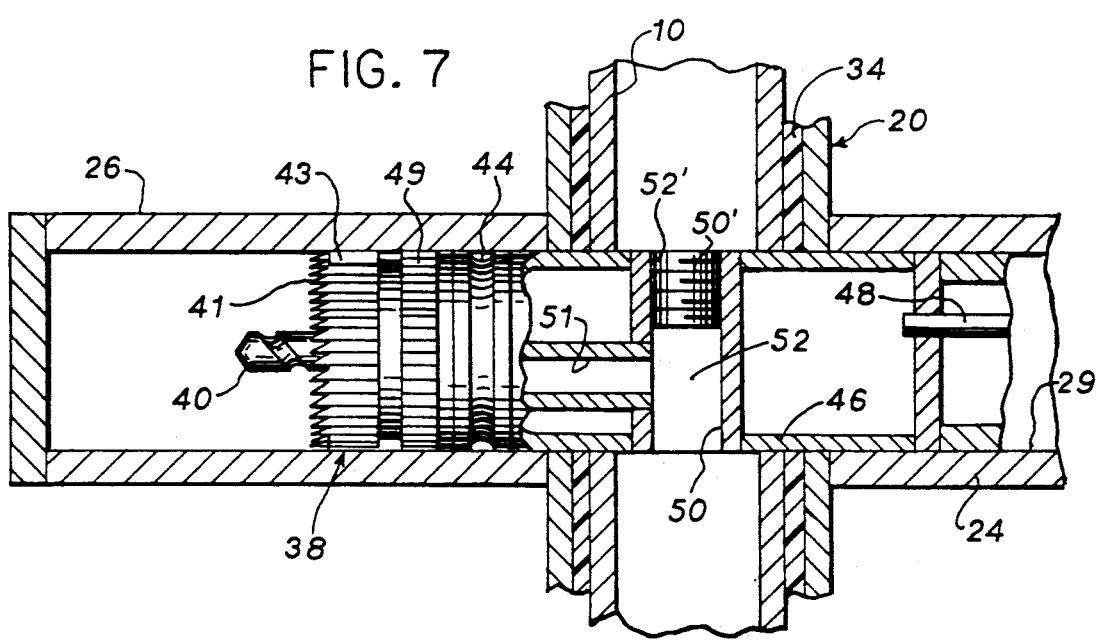
FIG. 7 ial hole laterally through the pipe and to close off the hole after cutting. The drill/gate may be subsequently withdrawn to open the valve, but the apparatus requires a complex variety of seals and packings to maintain a fluid tight valve.

DIRECTLY INSTALLED SHUT-OFF VALVE ASSEMBLY FOR FLOWING HIGH PRESSURE LINE

BACKGROUND OF THE INVENTION

The present invention relates to an apparatus and method for directly installing a shut-off valve in a flowing high pressure line and, more particularly, to such an apparatus and method for shutting off a flowing oil or gas well which is burning or out of control.

Apparatus and methods for handling oil well blow-outs and fires are well known in the art. One of the most common devices used to control a well is a blow-out preventer (BOP). A BOP or an array of BOPs are attached directly to the wellhead and operate to rapidly close an open well hole or the space between the casing and the drill pipe to prevent the escape of pressurized oil or gas. These devices work essentially as plugs and may be either insertable laterally into the casing (ram type BOP) or expandable radially to fill the casing (annular BOP). On a land well, the BOP is normally located at the ground surface and, in a subsea well, at the ocean floor.

Although blow-out preventers are effective in preventing blow-outs and ensuing fires, if the wellhead is damaged or if a fire occurs before the blow-out preventers operate to seal the well, BOPs may become largely ineffective. Once a well is out of control or on fire, resort must be made to other means to bring the well under control.

Various types of relatively unsophisticated, brute force methods are employed to control wild wells, including those which may be on fire. All of these methods operate essentially directly at the well head to attempt to cap and seal it off. Obviously, if the well is afire, greater difficulty and hazards must be faced.

U.S. Pat. No. 1,879,160 discloses a method and apparatus for shutting off a burning oil well by plugging the same from an access point below ground. The apparatus inserts a wedge-like plug laterally through a hole drilled in the production pipe (and outer casing, if present) to plug the pipe and seal off the flow. Mud and cement are then pumped into the pipe through the plug to seal off the well. This method and apparatus contemplates permanent sealing of the well and taking the same completely out of production.

The prior art also discloses various types of apparatus for installing a plug in a flowing high pressure pipeline which plug can be subsequently withdrawn and reseated as a fully operative valve. Each of these patents utilizes means to cut a hole through or cut a section out of the flowing pipeline while withstanding the pressure therein and then permanently placing the valve in position.

Nichols U.S. Pat. No. 3,699,996 shows an apparatus including a drilling and reaming tool to cut a cylindrical hole through the flowing pipeline using a powered rotational drive and an axial hydraulic ram. A valve seat and valve plug are mounted axially behind the drill and the seat automatically snaps into position upon completion of the drilling and the drill bit can be subsequently removed from the valve plug. This apparatus requires complex sealing and locking components and requires that the drill bit be removed from the seat/plug assembly before the valve is operable.

McKean U.S. Pat. No. 3,532,113 shows a combined cutting tool and gate valve which is used to cut a cylin- Margrave U.S. Pat. No. 4,552,170 shows a somewhat similar device, except that the drill which cuts a cylindrical hole through the pipe is followed axially by a tubular elastomeric seal which is radially expandable to seal the hole in response to axial compression imposed on the elastomer when the advancing cutting tool engages a stop after passing through the pipe.

Hefetz U.S. Pat. No. 3,993,137 discloses an apparatus in which axially aligned and diametrically opposite drill and plug members are mounted in a confining saddle arrangement around an outer casing, and the interior pipe is immobilized by drills entering the pipe radially from different directions. A large drill is then used to cut through both the casing and the interior pipe, the drill is withdrawn, the drill access chamber closed, and a plug inserted from the diametrically opposite side to seal the casing. The plug is also capable of being withdrawn to function as a valve. Means are also disclosed for maintaining operational flow of the well while it is plugged by diverting the flow through the plug.

Stupak U.S. Pat. No. 4,516,598 also discloses a drill and a plug in axial alignment on diametrically opposite sides of the pipe. However, after a hole is drilled through the pipe, the drill is withdrawn, the mounting saddle rotated 180°, and the plug inserted into the hole to plug the pipe.

Harrison et al U.S. Pat. No. 4,108,194 shows a method and apparatus for providing a tapered pipeline seal in which a straight cylindrical hole is first drilled through the pipe and the cylindrical hole is then reamed to a taper adapted to receive a subsequently inserted tapered plug to seal the hole. However, no means are described for holding against pressure in a flowing pipe while drilling, reaming, or changing tools. The apparatus and method are only useful in plugging an empty pipeline.

Therefore, an apparatus and method which operates simply and effectively to seal off a flowing high pressure pipeline with a minimum of complex components would be most desirable. In particular, a device which utilizes the drilling and/or finishing tool as an integral part of the operating valve would be most desirable. Also, any such apparatus must be capable of accommodating the high stresses encountered in the rotary drilling members, particularly when tapping into a flowing, high pressure oil well pipe.

SUMMARY OF THE INVENTION

In accordance with the present invention an apparatus is disclosed for drilling into a flowing high pressure line using rotary drilling and finishing tools with the latter functioning in lace as a fully operable valve plug upon completion of the finished hole. When used to control a well fire, flow may be halted as long as necessary to bring the fire under control and the valve subsequently reopened without adversely affecting the integrity of the production pipe or operation of the well. When using the apparatus of the present invention in this manner, the well pipe may be accessed just below the wellhead or, if a fire or other hazard prohibits access to the wellhead, the apparatus may be installed underground by tunneling. It is also contemplated to use the apparatus disclosed herein on offshore wells with access and attachment being made below the water surface.

A method for accessing, examining and preparing an underground well pipe for reopenable plugging is also disclosed. The method includes the basic steps of forming an access tunnel to the casing that encloses the well pipe, removing an exposed cylindrical section of the casing, attaching vertical load bearing supports between the exposed ends of the remaining casing above and below the section removed, attaching a tubular cylindrical saddle to enclose the pipe section, cutting a diametral hole through the saddle and pipe section, and plugging the hole with a plug inserted in the cutting direction.

In accordance with one embodiment of the invention, a housing including a generally cylindrical enclosure is attachable to the outer wall of a section of the production well pipe to be shut-off to completely surround and seal the section. The housing includes an access chamber extending radially away from the cylindrical enclosure and the outer wall of the pipe. Drilling and burnishing tools are positioned in axially adjacent alignment and rotatably mounted in the access chamber to be moved into cutting contact with the pipe. The drilling tool is adapted to cut a generally cylindrical hole radially through the outer cylindrical enclosure and the pipe, and the burnishing tool is adapted to follow the drilling tool to finish the hole surface. The burnishing tool may have a frustoconical outer surface which engages and finishes the surface of the cylindrical hole to the shape of the burnishing tool. When the hole is finished, the burnishing tool is directly positioned in the hole to seal the surface thereof and block flow through the pipe. Means are provided for rotating the drilling and burnishing tools, and for advancing the tools, holding the burnishing tool in sealing engagement, and retracting the burnishing tool and attached drilling tool to reopen the pipe to flow.

In another embodiment, the finishing tool provides a generally cylindrical finished hole and includes an outside surface portion which is adapted to sealingly engage the finished surface and plug the hole. The outside surface portion of the finishing tool comprises a hollow cylindrical sleeve having an expandable outer wall defining a closed interior. A source of fluid pressure is operatively connected to the closed interior of the sleeve such that it may be pressurized to cause the outer wall thereof to expand into sealing engagement with the finished surface of the hole.

The drilling and burnishing tools are attached to a main shaft and the main shaft is operatively attached to the means for rotating and advancing and burnishing tools for rotation in the access chamber. The drilling tool preferably includes an axial chip-receiving cavity extending from the end of the tool opposite its tip into the main shaft. The frustoconical outer surface of the burnishing tool has a minor outer diameter adjacent the drilling tool approximately equal to the diameter of the cylindrical hole and a major outer diameter adjacent the main shaft which defines a maximum tool diameter. In one embodiment, the drilling tool includes a cutting tip with a reamer section between the cutting tip and the burnishing tool. The reamer section may be tapered to diverge away from the tip and the taper may conform generally to the taper of the frustoconical surface of the following burnishing tool.

The apparatus for installing the shut-off valve may include means for at least partial relief of the pressure in the pipe upstream of the valve plug. The pressure relief means operates continuously to provide flow bypass while the hole is being cut and flow diversion from the valve plug to the outside of the housing after the valve is in place. In a preferred form of the apparatus of the invention, the pipe-enclosing housing includes a receiving chamber diametrically opposite the access chamber into which the cutting tool moves axially after completion of the hole. The receiving chamber also provides a convenient means for effecting pressure relieving flow diversion while the hole is closed by the valve plug.

The pipe-enclosing housing may comprise a split cylindrical sleeve adapted to tightly surround and be welded to the pipe. The pipe-enclosing housing may alternately comprise a split cylindrical sleeve having an ID slightly larger than the OD of the pipe and positionable concentrically therewith to define a thin annular space. The annular space is filled with a hardenable material which sets to sealingly and rigidly secure the sleeve to the pipe. The sleeve is appropriately sealed at its opposite ends to the outside of the pipe to provide an enclosed annular space into which the hardenable material may be injected from outside the sleeve.

In a preferred embodiment, the means for advancing the drilling and finishing tools comprises a fluid cylinder which is attached to the access chamber and adapted to receive the main shaft extending through the cylinder on the axis thereof. An annular piston is fixed to the main shaft within the fluid cylinder to sealingly engage the cylindrical interior thereof and to rotate therein with the main shaft. A source of fluid pressure is operatively connected to the interior of the cylinder to move the piston and shaft axially for advancing the drilling and finishing tools. The drill and finishing tool rotating means comprises a driven sprocket fixed to the main shaft for rotation therewith and having a peripheral driven edge portion concentric therewith. A torque arm is rotatably attached to the main shaft and extends radially outward to an outer end beyond the driven edge portion of the sprocket. A prime mover is attached to the torque arm and is drivingly connected to the driven edge portion of the sprocket to rotate the same, along with the main shaft, relative to the torque arm. The outer end of the torque arm is slidably attached to the fluid cylinder to fix the torque arm against rotation but allow the toque to move axially with the main shaft and sprocket relative to the cylinder.

BRIEF DESCRIPTION OF THE DRAWINGS

FIG. 5 is an enlarged vertical section through a well production pipe showing the attachment of a portion of the apparatus of the present invention.

FIG. 6 is a horizontal section taken on line 6—6 of FIG. 5.

FIG. 7 is a vertical section similar to FIG. 5 showing the pipe fully closed and sealed.

DETAILED DESCRIPTION OF THE PREFERRED EMBODIMENTS

Figure 1:
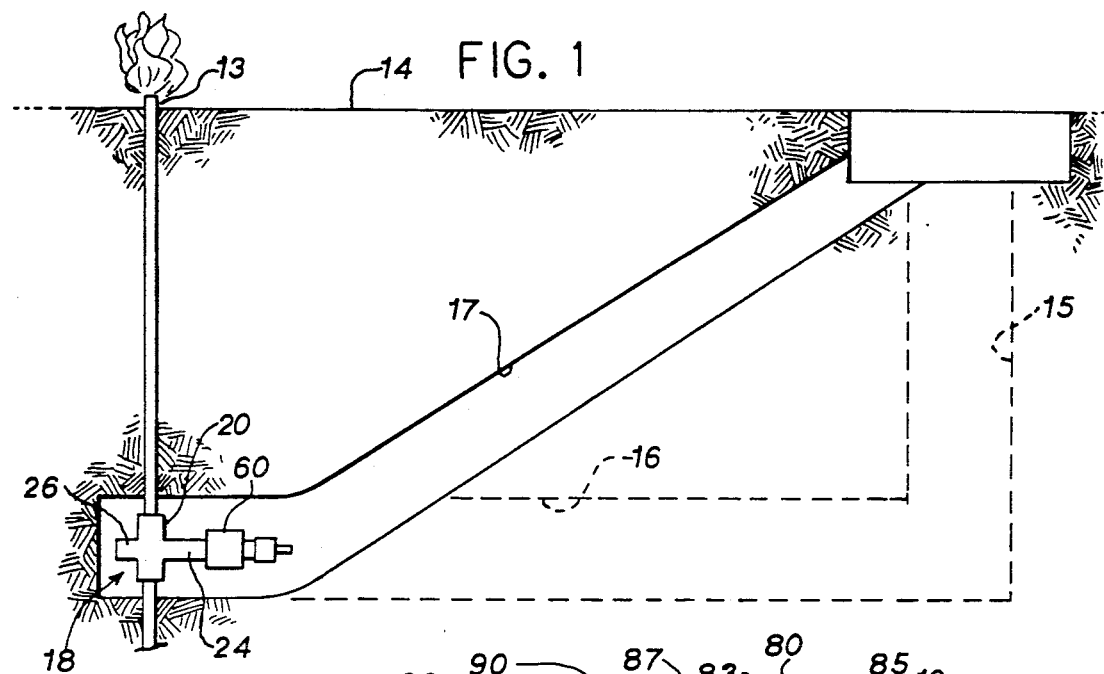
FIG. 1 is a vertical section of an oil well showing a generalized arrangement for providing access to and setting up the apparatus of the present invention.
Figure 2:
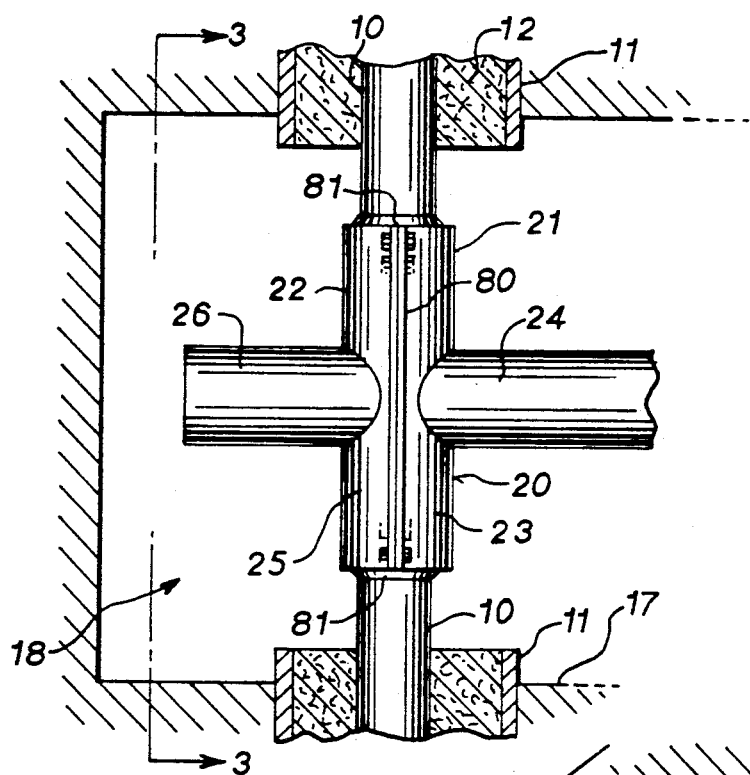
FIG. 2 is an enlarged elevation view of the workspace around the accessed underground pipe after installation of the pipe cutting and plugging apparatus of the present invention.

In FIG. 1, the general arrangement of an operating well is shown. Referring also to FIG. 2 for added detail, the interior production pipe 10 is positioned within an outer casing 11, and the annular space between the casing and production pipe is filled with concrete 12 or other material to keep the production pipe 10 in position. If there has been a blowout and the well is on fire, all of the apparatus at the wellhead 13, such as valves, blowout preventers and the like, has likely been damaged or destroyed and is inoperative. Thus, after or simultaneously with bringing the fire under control, it is necessary to apply some apparatus for at least temporarily shutting off the flow of oil until complete repairs at the wellhead may be accomplished. In accordance with the present invention, an apparatus for temporarily shutting off the flow of oil and subsequently operable to reopen the production pipe 10 is installed below ground level 14 at a depth sufficient to protect the apparatus and workers from the heat and other dangers of the fire at the wellhead 13.

Figure 3:
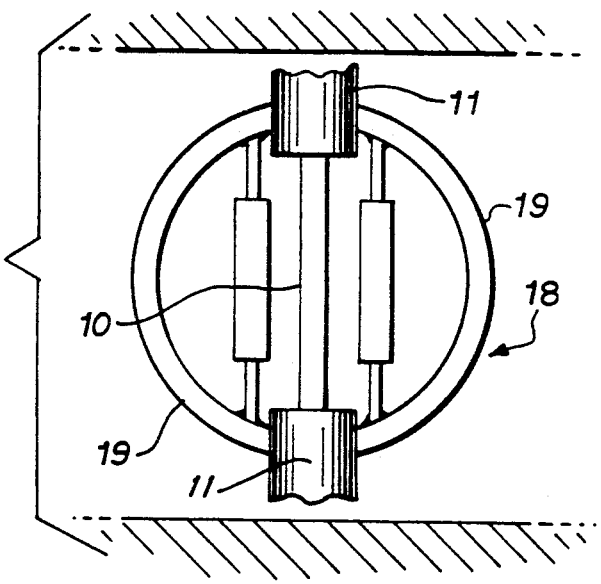
FIG. 3 is an end elevation of the assembly taken on line 3—3 of FIG. 2.

Access to the well casing 11 may be attained in any convenient manner, such as drilling a vertical access shaft 15 a safe distance from the wellhead 13 and extending a horizontal access tunnel 16 from the bottom of the access shaft to the well casing 11 as shown in dashed lines. Alternately, an angled access shaft 17 could be cut more directly to the point of well access and such access may be preferable. To access a burning well, the access shaft 15 or 17 should be started some significant distance from the wellhead, e.g. 100 feet or ore, and preferably the excavation site is protected by some sort of heat shield. A trench approximately 20 feet wide radially with respect to the well and about 10 feet deep may be prepared and the shaft 17, or shaft 15 and access tunnel 16 dug, shored, lighted and ventilated in a well known manner. A workspace 18 is excavated around the casing 11, a section of the casing is cut away, and the concrete 12 is removed to expose the production pipe 10, as shown in more detail in FIGS. 2 and 3. Some well constructions may also include an additional outer casing or casings. For example, a very large diameter outermost casing may extend to a relatively shallow depth in relation to the depth to the oil bearing formation. In addition, a smaller diameter but much deeper aquifer casing may be utilized. The outermost casing may be cemented in place, depending on soil conditions, and the annular spaces between the outermost and aquifer casings and the aquifer and main well casings 11 may be filled with concrete, in a manner similar to the concrete sleeve 12. In these situations, the outermost and aquifer casings, as well as any intervening concrete layers, must also be cut away.

However, before the casing 11 is cut away, certain preliminary examinations and preparations should be made to determine the position and condition of the production pipe inside the casing. From within the workspace 18, the well casing may be x-rayed in the x-y direction (e.g. from two perpendicular directions) to determine the position of the production pipe 10 and estimate its wall thickness. The high rate flow from producing wells is known to have an abrasive and erosive effect on the inside surface of the production pipe 10. As a result, the actual wall thickness of the production pipe may be substantially less than when originally installed and may even be structurally unsound. It may also be helpful and advisable to pressure test the interior of the production pipe 10 which test could also provide information as to the ability of the production pipe to withstand the internal pressure after the casing 10 and concrete 12 are removed from the section of interest. From outside the casing 11, a small hole may be drilled and tapped in the production pipe 10, the internal pressure measured, and the hole suitably plugged. The test hole may be located directly on the centerline or axis of the bore of the valve to be installed, as will be described hereinafter If the preliminary tests and examination indicate that it is safe to proceed, a section of the outer casing 11, for example 4 feet in length, is cut away. A cutter utilizing, for example, a water jet or a more conventional milling apparatus is attached to the casing to make two axially spaced circumferential cuts which are subsequently joined by one or more vertical cuts. Preferably, the case cutter is operated by remote control after installation of appropriate closed circuit TV monitoring equipment and methane and hydrogen sulfide gas detectors, and removal of all personnel from the workspace, tunnel and access shaft.

If the workspace is found free of gases and otherwise safe, the workspace may be re-entered and the outer case peeled away to access the concrete liner 12. However, before cutting away the concrete, it may be advisable to weld prestressed supports 19 to the upper and lower ends of the cut casing 11 to bridge the cutout gap therein. Before welding, the supports 19 are prestressed by attaching a fluid cylinder between opposite ends of each support and retracting the cylinder to impose a desired preload. After welding the supports 19 to the casing 11, the cylinders are removed. This is to prevent the entire compressive load of concrete 12 and outer casing 11 from being borne by the production pipe 10 after the concrete is cut away to expose the pipe. The bracing is prestressed to a level sufficient to support the calculated weight of the column of concrete and steel casing. If the well includes a large diameter outermost casing and/or an aquifer casing, the supports 19 may be welded to the ends of those casings, instead of or in addition to welding to casing 11.

The concrete is then removed by any appropriate means which may comprise hardened surface scarifire or grinder or a water jet cutting device. The apparatus used to previously cut the outer casing 11 may be conveniently adapted to operate and carry the concrete cutting device as well. Preferably, a metal proximity sensor is utilized to monitor the distance of the concrete cutting tools from the outer surface of the production pipe 10 and to stop the concrete cutting tool when it is close to, but before it contacts the pipe. The remaining thin layer of concrete, e.g. about ½ inch, is removed by hand. It may also be possible to use concrete cutting means which will remove the concrete but not damage the steel pipe 10 should it come in direct contact therewith. A water jet cutter may be operated in this manner. The exterior of the exposed production pipe 10 is then cleaned and the previously installed pressure test plug is inspected to make sure it does not leak.

Referring also to FIGS. 4-7, the apparatus for installing a shut-off valve into the production pipe 10 comprises a split housing or saddle 20 including an access half 21 and a receiver hald 22. The access hald 21 of the saddle 20 includes a semicylindrical sleeve portion 23. An access chamber 24 having a cylindrical bore 29 is attached to and extends laterally away from the semicircular sleeve portion 23 of the access half of the saddle 20. The cylindrical bore 29 is adapted to carry the cutting tool and sealing member as will be described hereinafter. The receiver half 22 of the saddle 20 also includes a semicylindrical sleeve portion 25 having an inside diameter identical to the other semicylindrical sleeve portion 23. The semicylindrical sleeve portions 23 and 25 of the access half and receiver half 21 and 22, respectively, are adapted to fit around and enclose the exposed section of the production pipe 10. The receiver half 22 includes a receiving chamber 26 extending laterally from the semicylindrical sleeve portion 25, diametrically opposite and in axial alignment with the bore 29 in the access chamber 24.

The enclosing cylindrical sleeve formed by the saddle 20 may fit tightly around the exposed section of the pipe 10 or may have an inside diameter slightly larger than the pipe which is filled with a hardenable material. In the former case, as shown for example in FIGS. 2, 10 and 11, the semicylindrical sleeve portions 23 and 25 are welded directly to the pipe 10. Thus, the abutting edges of the sleeve portions 23 and 25 are joined with a continuous longitudinal welds 80 on diametrically opposite sides In addition, the opposite axial ends of the saddle 20 are welded directly to the pipe 10 with continuous circular welds 81. The combination of welds 80 and 81 tightly seals and rigidly reinforces the section of the pipe 10 which the saddle 20 surrounds and encloses.

An alternate means of attaching the saddle 20 may be used. Prior to attaching the halves 21 and 22 of the saddle 20 to the pipe, upper and lower O-rings 27 and 28, respectively, are attached to the pipe 10 spaced apart axially by a distance slightly less than the length of the saddle 20. The inside surfaces of the semicylindrical sleeve portions 23 and 25 are provided with continuous upper and lower O-ring grooves 30 and 31 to receive therein the outer surfaces of the O-rings 27 and 28 when the saddle halves 21 and 22 are brought together to enclose the production pipe. The saddle halves are clamped together with a series of closely spaced bolts 32 connecting continuous axially extending clamping flanges 33 secured to the half sections 21 and 22 adjacent their abutting edges. The abutting edges of the semicylindrical sleeve portions 23 and 25 may be coated with a layer of epoxy or other sealant before they are brought together and clamped. The ID of the cylindrical sleeve formed by the saddle halves 21 and 22 is slightly larger than the OD of the production pipe 10. Thus, when the saddle is clamped and sealed around the pipe, a thin annular space 34 is provided between the saddle and the production pipe and bounded above and below by the upper and lower O-ring seals 27 and 28. One or both of the saddle halves 21 or 22 is provided with a lower fill port 35 and an upper relief port 36. Liquid epoxy or another suitable hardenable sealing material is injected into the fill port 35 until the entire annular space 34 is filled with epoxy, as evidenced for example by material bleeding out the relief port 36. The relief port 36 is then plugged with a high pressure gauge (e.g. 10,000 psi) and additional epoxy is injected to pressurize the unhardened material in the annular space to reduce or eliminate air bubbles and assure complete filling. The injection pressure may be raised to, for example, 5,000 psi and maintained until the epoxy is cured.

Figure 8:
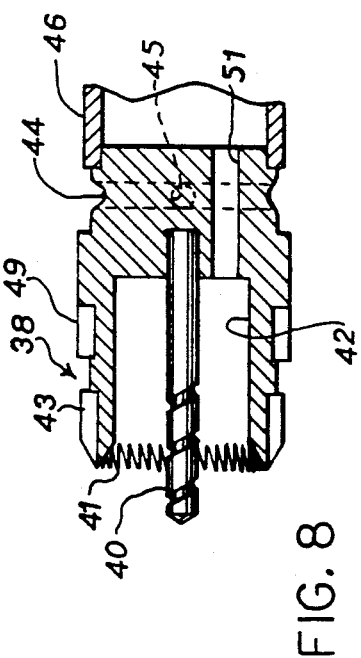
FIG. 8 is a vertical section through the drill shown in FIG. 7.

Referring also to FIG. 8, an assembly for drilling, reaming, finishing and sealing a valve plug hole through the saddle sleeve, epoxy layer and production pipe is positioned in the bore 29 of the access chamber 24. The assembly is rotated and advanced axially by an apparatus which will be described in greater detail hereinafter. The drill 38 includes a small diameter pilot drill 40 which may be positioned to drill directly into the plug previously inserted in the initial pressure test hole, but this is not necessary. The pilot drill is followed by a hole cutter 41 to provide a large diameter rough cut hole just slightly smaller than the desired finished size. Cuttings from the pilot drill and larger pieces from the hole cutter may be directed into and received by an annular chip cavity 42 separating the drill and the cutter. The hole cutter is followed immediately by a reamer 43 to provide a partially finished cylindrical hole completely through the saddle sleeve, epoxy layer and production pipe. Finally, the hole is finished and properly sized with honing stones 49 following the reamer 43 and defining a slightly larger diameter. The advancing drill 38, reamer 43 and honing surface 49 are received in the receiving chamber 26.

Because the production pipe is flowing under high it is most desirable to assure that some pressure relief is always provided during the drilling process and subsequently after the pipe has been plugged and sealed. Until the drill is fully into the opposite side of the production pipe, oil under the well pressure head may continue to flow past the end of the drill. To accommodate pressure relief after the drill has cut fully into the opposite face of the production pipe 10, a pressure relief section 44 is positioned axially behind the trailing end of the honing section 49 of the drill 38. The relief section may comprise a solid section of the drill 38 block through which are cross-drilled a pair of through holes 45. The holes allow the continuous flow of oil through the rotating drill assembly after full penetration by the drill has substantially closed off the production pipe 10. As a preferred alternate to the through holes 45, the pressure relief section 44 may be provided with a circumferential groove around the entire outer surface thereof.

One embodiment of the valve plug member comprises a relatively thin walled hollow cylindrical plug 46 attached to the pressure relief section 44 and having an outside diameter approximately equal to but very slightly smaller than the diameter of the through hole finished by the honing section 49. As the drill, reamer, honing section and pressure relief section pass out of the saddle 20 and into the receiving chamber 26, the cylindrical plug 46 passes into the finished cut hole to completely fill it and plug the interior of the production pipe. As shown in the drawings, the diameter of the finished cut hole 47 is slightly larger than the ID of the cylindrical sleeve portion 23, 25 of the saddle such that the hole cutter 41 and reamer 43 cut slightly into this surface, as shown in FIG. 6. The diameter of the finished cut hole 47 may be made slightly smaller, if desired, to cut peripherally into the epoxy layer in the annular space 34 or, even smaller yet, to cut peripherally only into the production pipe 10. However, because the structural integrity of the production pipe may be less than satisfactory, a larger hole extending peripherally into the outer saddle sleeve is presently preferred.

When the hollow cylindrical plug 46 is in position to close the pipe, as shown in FIG. 7, the interior of the plug is pressurized via an axially disposed hydraulic fluid line 48, causing the OD of the plug 46 to expand tightly and sealingly into engagement with the surface of the finished hole 47. The sealing pressure within the cylindrical plug 46 may be supplied and maintained via the fluid pressure supply line 48 to a fluid pressure connection 53 (FIG. 4).

To maintain the desired relief of well pressure, a pressure relief hole 50 is provided in the outer surface of the cylindrical plug 46 and is connected by an elbow 52 inside the plug to a pressure relief line 51 extending axially into and through the body of the drilling tool 38 and into the open chip cavity 42. Flow from the pressure relief line 51 passes into the receiving chamber 26, out of the chamber via aperture 59, and is ultimately directed through the access tunnel 16 and shaft 15 or 17 to the surface. After the reamer 43 has passed fully through the finished cut hole 47, rotation of the drill may be halted and the cylindrical plug pushed axially into the hole. However, the plug 46 must be oriented with the pressure relief hole 50 facing downwardly into the flowing production pipe to assure proper pressure relief. The elbow 52 and pressure relief hole 50 are preferably formed from a sleeve 52' welded or otherwise securely fixed in a cross hole formed through the cylindrical plug 46. The downstream end of the sleeve 52' is sealed as with a plug 50'. The sleeve 52' provides support to the hollow plug 46 against excessive deflection and possible rupture under high sealing pressure inside the expandable plug. Even if oil well pressure and flow relief is not needed, it is desirable to reinforce the interior of the hollow cylindrical plug 46 for the same reason.

If it is desired to reopen the production pipe, the cylindrical plug 46 is depressurized by relief flow via operation of the control valve 54 and the plug is axially withdrawn into the access chamber 24 (along with the drill assembly 38). The product on pipe 10 is then fully open and unobstructed to allow full flow or access by well operating tools and the like. When the cylindrical plug 46 and drill assembly have been withdrawn into the access chamber, the plug may be repressurized into sealing contact with the access chamber bore 29. Other or supplemental sealing means, such as will be described with reference to FIG. 12, may also be used. Also, the valve may be reclosed, if necessary, by simply repositioning the plug in the cut hole 47 and repressurizing.

Figure 12:
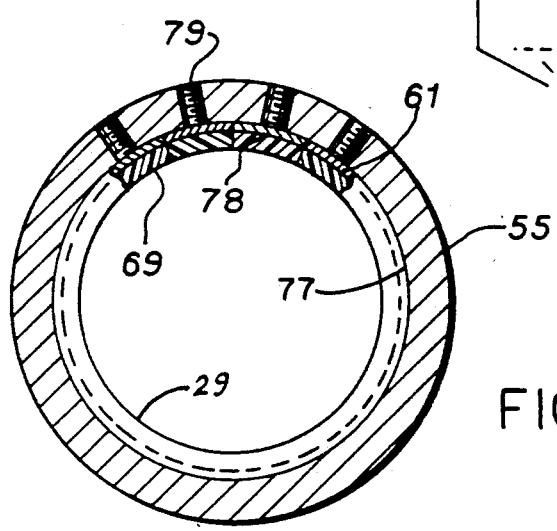
FIG. 12 is a sectional view taken on line 12—12 of FIG. 9.
Figure 4:
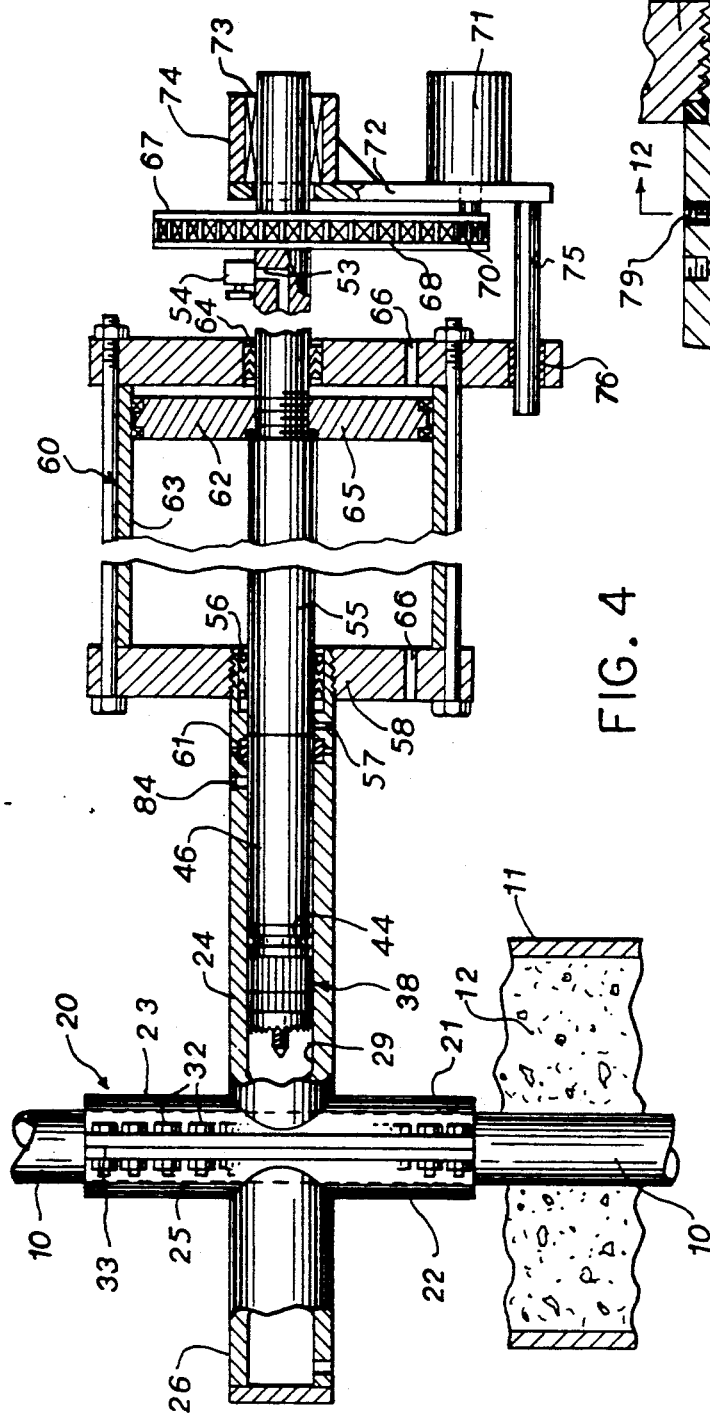
FIG. 4 is a side elevation, partly in section, showing the presently preferred embodiment of the apparatus of the present invention.
Figure 9:
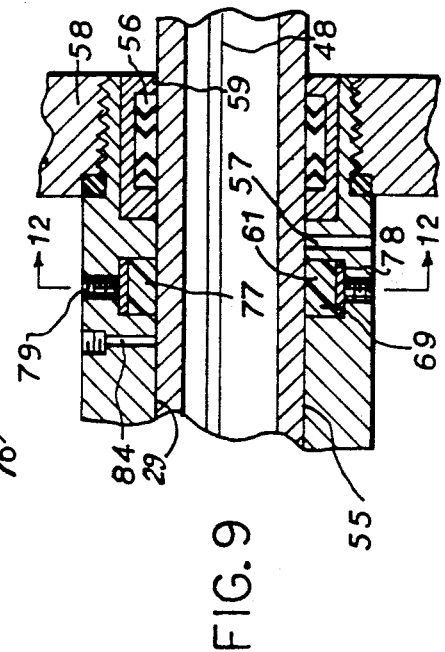
FIG. 9 is an enlarged vertical section of a portion of FIG. 4.

The preferred embodiment for the apparatus used to rotate and advance the drill assembly 38 is also shown in FIG. 4. A main driveshaft 55 extends axially from its attachment to the cylindrical plug 46 to operative connection to the drive mechanism. A set of first main shaft seals 56 is disposed in the access chamber bore 29 at the end thereof farthest from the production pipe. The first main shaft seals 56 may be set into an annular retaining ring 59 of brass or other suitable metal set into the end of the driveshaft 55. Preferably, the set of shaft seals 56 includes oppositely oriented seals capable of sealing against fluid pressure exerted in either axial direction. The brass retaining ring 59 also functions as a sleeve bearing for the shaft 55 rotating therein. The bore 29 and main shaft section therein must be long enough to accommodate the fully withdrawn valve plug 46 and drill assembly 38. A peripheral drain slot 57 is also cut into the surface of the bore 29 near the first shaft seals 56 and is suitably tapped to allow well fluid passing down the bore to be drained. The bore 29 of the access chamber adjacent the drain slot 57 may also be provided with a sealing mechanism for more permanently sealing the expandable plug 46 in the bore of the production pipe 10. Referring also to FIG. 12, a series of annular seal segments 61 may be placed in an annular circumferential slot 77 in the bore 29. Each seal segment 61 comprises an elastomer segment 69 bonded to a metal backing plate 78, with the seal segments 61 filling the circumferential slot 77 but normally not tightly sealing against the shaft 55. A set screw 79 is threaded through a suitably tapped hole in the wall of the access chamber 24 for each annular seal segment 61. Each set screw 79 may be turned into engagement with the metal backing plate 78 to force the elastomer segments 69 into sealing engagement with each other, with the walls of the annular slot 77, and the shaft 55. The shaft 55 may also be provided with a radial tapped hole 84 through which drill bit lubricant may be injected, if desired.

A large diameter hydraulic cylinder 60 is rigidly attached to the end of the access chamber 24. Specifically, the forward end wall 58 of the cylinder 60 is threadably attached, welded, or otherwise suitably attached to the access chamber. The cylindrical shell 63 of the cylinder 60 is attached and sealed at one end to the forward end wall 58 and at the opposite end to a rear end wall 62. Rear end wall 62 houses a rear main seal and bearing assembly 64 to seal against loss of fluid pressure in cylinder 60 and journal the main shaft for rotation therein. A piston 65 is disposed within the cylinder 60 and is keyed or otherwise fixed to the main shaft 55 to rotate therewith. The piston 65 is also adapted to reciprocate axially within the cylinder to drive the drill assembly 38 and to position the cylindrical plug 46 to close or reopen the production pipe. The cylinder 60 is double acting with fluid from a suitable hydraulic pressure source supplied via hydraulic pressure ports 66. Spaced from the rear end wall 62 of the cylinder and fixed to the main shaft 55 is a large diameter driven sprocket 67. The driven sprocket teeth may be cut to receive a multi-strand drive chain 68 operatively connected to a small diameter drive sprocket 70 driven by a motor 71. Motor 71 is mounted on the radially outer end of a torque arm 72 which has an inner hub 74 rotatably mounted on the end of the driveshaft 55 by a journal bearing 73. To hold the torque arm against rotation around the driveshaft, but to allow the torque arm to advance axially with the driven sprocket as the hydraulic cylinder 60 is extended, a torque transfer arm 75 is fixed to the outer end of the torque arm and has an opposite end slidably mounted in a linear bearing 76 in the outer edge of the rear end wall 62 of the cylinder.

The hydraulic fluid line 48 terminates at the fluid pressure connection 53 in the drive shaft 55 between cylinder end wall 62 and sprocket 67.

Figure 11:
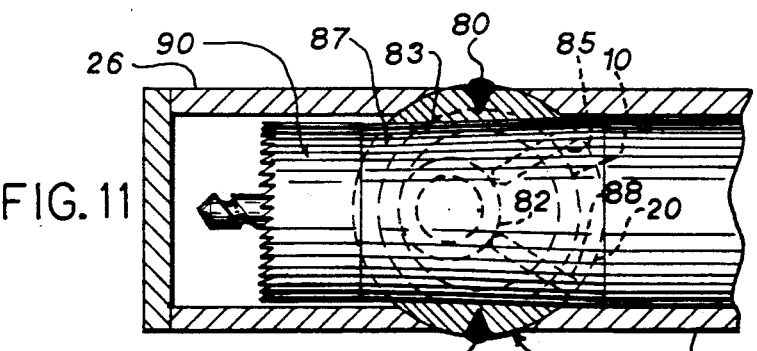
FIG. 11 is a sectional view taken on line 11—11 of FIG. 10.
Figure 10:
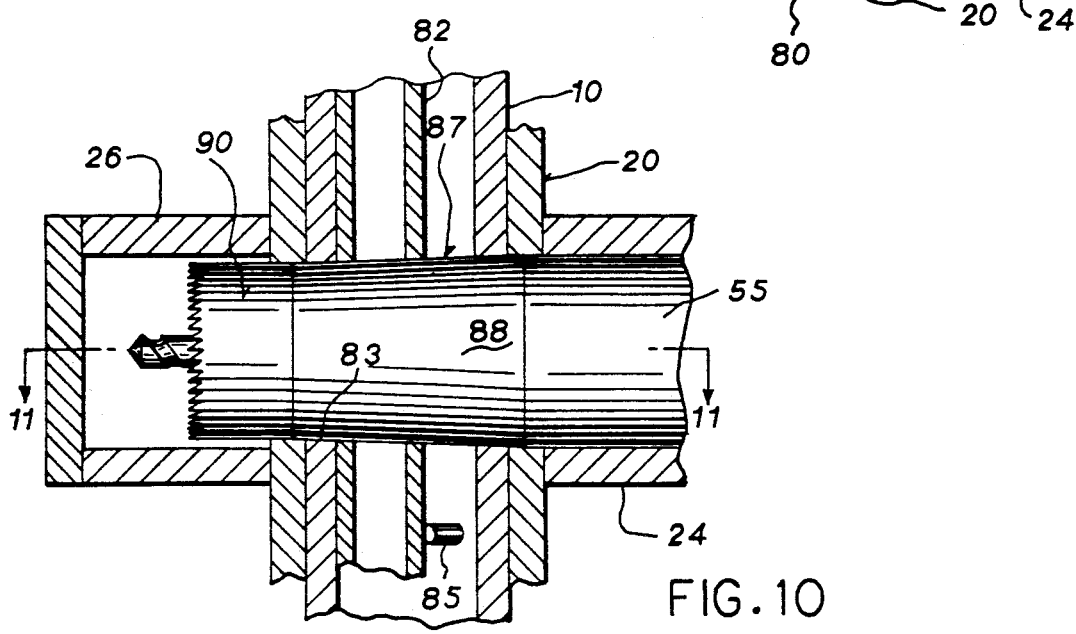
FIG. 10 is a vertical section similar to FIG. 4 showing an alternate embodiment of the apparatus for drilling and sealing the well pipe.

In FIGS. 10 and 11, there is shown an alternate embodiment of the pipe closure device in the form of a tapered plug 87. The embodiment in these figures also shows an alternate well construction in which a relatively small diameter production tube 82 is positioned inside the main production pipe 10. The production tube 82 is not restrained laterally and, in certain well configurations carries the production flow of oil to the wellhead. The annular space between the outside of the production tube 82 and the ID of the pipe 10 might, under normal operating circumstances, be sealed of at the wellhead and contain well gas under very high pressure. However, if the well is flowing out of control and/or on fire, oil may be flowing in both the production tube 82 and the production pipe 10. In the situation where an interior production tube 82 is present, it must of course be cut away when the hole is cut through the saddle 20 and production pipe 10. The tapered plug comprises a frustoconical body 88 having a hardened steel outer surface which is adapted to follow a drill assembly 90, similar to that shown in the prior embodiment, and to burnish the surface of the cylindrical hole formed by the drill to a smooth finished taper. The taper may be very slight, e.g. 0.020 inch over 10 inches of axial length. The main shaft mounting the tabered plug and drill is rotated and advanced until the leading end of the plug adjacent the drill 90 has passed nearly or completely through the opposite wall of the saddle 20, after which rotation is ceased and pressure in the cylinder 60 holds the plug in sealing engagement to close off the production pipe 10.

As the drill 90 initially passes through the saddle 20 and enters the production pipe 10, it will engage the production tube 82 and force it against the opposite side of the pipe 10 as the drill advances. The drill will then cut into and completely through the production tube before the drill completes its cut and exits the opposite face of the saddle and enters the receiving chamber 26. It may be desirable to immobilize the production tube 82 while it is being cut to prevent it from being deflected by the rotating drill 90. The tube may be immobilized by confining it against the wall of pipe 10 with screws 85 inserted through the walls of the saddle 20 and pipe 10 above and/or below the drill and plug to bear against the outside of the tube 82. To provide a good fluid-tight seal between the frustoconical body 88 and the tapered hole 83, it has been found helpful either to continue unidirectional rotation of the tapered plug or to rotate the tapered plug back and forth on its axis while maintaining sealing pressure in the cylinder 60. Once the tapered plug 87 is seated in the tapered hole 83, flow through the production pipe 10 (including any flow in the production tube 82) is completely halted. If necessary, the levered end of the production tube 82 above the plug 87 may be removed from the pipe 10 prior to repairing the wellhead valve apparatus. Once repairs have been effected at the wellhead, the plug 87 and drill assembly 90 may be axially withdrawn into the access chamber 24, thereby completely reopening the production pipe 10. From the wellhead, the upper end of the severed lower portion of the production tube 82 may be accessed from the wellhead and reconnected with a new upper production tube section, all in a known manner.

If necessary, of oil pressure in the production pipe below the plug may be relieved by utilizing a pressure relief hole and line in much the same manner as with the cylindrical plug 46. Similarly, the tapered plug 87 may be retracted axially to subsequently reopen to the production pipe or, alternately, the tapered plug may be provided with a through bore rotatable with the plug from a sealed position 90° to align the access of the plug bore with the centerline of the production pipe to reopen the same.

Various modes of carrying out the present invention are contemplated as being within the scope of the following claims particularly pointing out and distinctly claiming the subject matter which is regarded as the invention.

I claim:

1. An apparatus for installing a shut-off valve into a flowing high pressure pipe, said apparatus comprising:
   a housing attachable to the outer wall of a section of the pipe to surround and seal the section;
   said housing including an access chamber extending radially away from the outer wall of the pipe;
   drilling and burnishing tools rotatably mounted in axially adjacent alignment in said access chamber as a single unit and movable axially therethrough, said drilling tool adapted to cut a generally cylindrical hole radially through the pipe and said burnishing tool adapted to follow said drilling tool and having a frustoconical outer surface to engage and finish the surface of said cylindrical hole to conform to said frustoconical surface;
   said burnishing tool positionable in said finished hole to sealingly engage the surface thereof and to block flow through the pipe;
   means for rotating said drilling and burnishing tools; and,
   means for advancing said drilling and burnishing tools as a single unit, for holding said burnishing tool in sealing engagement with the surface of said cylindrical hole after said drilling tool has passed completely through said hole, and for retracting at least said burnishing tool to reopen the pipe to flow.

2. The apparatus as set forth in claim 1 wherein said drilling and burnishing tools are attached to a main shaft and said main shaft is supported for rotation in said access chamber.

3. The apparatus as set forth in claim 2 wherein said drilling tool includes a chip receiving cavity extending axially from the end of the drilling tool opposite its tip into said main shaft.

4. The apparatus as set forth in claim 2 wherein the frustoconical outer surface of said burnishing tool has a minor outer diameter adjacent said drilling tool approximately equal to the diameter of said cylindrical hole and a major outer diameter adjacent said main shaft defining a maximum tool diameter.

5. The apparatus as set forth in claim 4 wherein said drilling tool includes a cutting tip and a reamer section between said cutting tip and said burnishing tool.

6. An apparatus for installing a shut-off valve into a flowing high pressure pipe, said apparatus comprising:
   a housing attachable to the outer wall of a section of the pipe to surround and seal the section;
   said housing including an access chamber extending radially away from the outer wall of the pipe;
   drilling and finishing tools rotatably mounted together in axially adjacent alignment in said access chamber and movable axially therethrough to sequentially drill and finish a hole radially through the pipe in a single continuous operation, said hole defining a finished surface having a diameter slightly larger than the inside diameter of the pipe;
   said finishing tool including an outside surface portion adapted to sealingly engage said finished surface and to plug said hole after passage of the drilling tool through said hole;
   said outside surface portion comprises a hollow cylindrical sleeve attached to said finishing tool, said sleeve having an expandable outer wall defining a closed interior, and a source of fluid pressure operatively connected to the interior of said sleeve for pressurizing said interior and causing said outer wall to expand into sealing engagement with said finished surface of said hole; and, means for rotating and advancing said drilling and finishing tools, for drilling said hole in said pipe, for inserting said expandable sleeve in said hole, and for retracting at least said expandable sleeve after the interior of said sleeve has been depressurized to reopen the pipe to flow.

7. An apparatus for installing a shut-off valve into a flowing high pressure pipe, said apparatus comprising:
a housing attachable to the outer wall of a section of the pipe to surround and seal the section;
said housing including an access chamber extending radially away from the outer wall of the pipe;
drilling and finishing means rotatably mounted together in said access chamber and movable axially for cutting and finishing a hole through the pipe in a single continuous operation, said hole defining a finished surface having a diameter slightly larger than the inside diameter of the pipe;
valve plug means attached to and movable with said drilling and finishing means for engaging the finished surface of said hole and plugging said hole after passage of said drilling means through said hole;
means for rotating said drilling and finishing means and for advancing said drilling and finishing means axially for drilling said hole in said pipe, for inserting said valve plug means in said hole, and for retracting at least said valve plug means to reopen the pipe to flow;
said means for rotating comprising a main shaft having said drilling and finishing means and said valve plug means attached to one end, said main shaft supported for rotation in said access chamber, and drive means attached to said main shaft remote from said one end for rotating said shaft; and
said means for advancing comprising a fluid cylinder attached to said access chamber and adapted to receive said shaft with said shaft extending through said cylinder on the axis thereof, an annular piston fixedly attached to said main shaft within said fluid cylinder, said piston sealingly engaging the cylindrical interior of said cylinder and rotatable therein with said main shaft, and a source of fluid pressure operatively connected to the interior of said cylinder for moving said piston and shaft axially therein.

8. The apparatus as set forth in claim 7 wherein said rotating means comprises:
a driven sprocket fixedly attached to said main shaft for rotation therewith and having a peripheral driven edge portion concentric therewith;
a torque arm means rotatably attached to said main shaft and extending radially outward to an outer end beyond said driven edge portion;
a prime mover attached to said torque arm means and drivingly connected to the driven edge portion of said sprocket to rotate said sprocket and main shaft relative to said torque arm means; and,
means for slidably attaching the outer end of said torque arm means to said fluid cylinder to fix said torque arm means against rotation and to allow said torque arm means to move axially with said main shaft and sprocket relative to said cylinder.

9. An apparatus for installing a shut-off valve into a flowing high pressure pipe, said apparatus comprising:
a housing attachable to the outer wall of a section of the pipe to surround and seal the section;
said housing including an access chamber extending radially away from the outer wall of the pipe and a receiving chamber extending radially away from the outer wall of said pipe diametrically opposite said access chamber;
cutting means rotatably mounted in said access chamber and movable axially for cutting a hole through the pipe, said hole defining a surface having a diameter slightly larger than the inside diameter of the pipe;
valve plug means attached to and movable with said cutting means for engaging the surface of said hole and plugging said hole immediately after passage of said cutting means through said hole; and,
means for rotating said cutting means for cutting said hole in said pipe, for advancing said cutting means axially through said hole during cutting and into said receiving chamber, for inserting said valve plug means in said hole, and for withdrawing at least said valve plug means to reopen the pipe to flow.

10. The apparatus as set forth in claim 9 including means for relieving pressure in the pipe upstream of said valve plug means comprising:
flow bypass means for providing a first continuing flow through the pipe during cutting of the hole; and,
flow diversion means for providing a second continuing flow through the valve plug means to the outside of said housing during plugging of the hole.

11. The apparatus as set forth in claim 10 wherein said flow bypass means is attached to and separates said cutting means and said valve plug means.

12. The apparatus as set forth in claim 11 wherein said flow diversion means comprises:
a pressure relief opening in said valve plug means positionable in an upstream direction to receive said second continuing flow;
a relief passage extending from said relief opening through said valve plug means and cutting means, and into said receiving chamber; and,
vent means in said receiving chamber for directing said second continuing flow to the outside of said receiving chamber.

13. The apparatus as set forth in claim 1, 6, 7 or 9 comprising:
said housing including a pipe-enclosing sleeve having a cylindrical interior slightly larger than the outside diameter of the pipe and positionable concentrically thereto to define a thin annular space;
means for filling said annular space with a hardenable material to sealingly and rigidly secure the sleeve to the pipe.

14. The apparatus as set forth in claim 13 wherein said housing comprises:
a pair of semicylindrical sleeve portions joined to form said sleeve; and,
inner peripheral sealing means at opposite ends of said sleeve and surrounding the pipe for sealing the opposite ends of said annular space.

15. The apparatus as set forth in claim 14 including a fill port for said hardenable material in said sleeve in communication with said annular space, and a relief port spaced from said fill portion in said sleeve in communication with said annular space.

16. A method for installing a shut-off valve into a flowing high pressure pipe, said method comprising the steps of:
(1) attaching a housing to the outer wall of a section of the pipe to surround and seal the section;
(2) providing said housing with an access chamber extending radially away from the outer wall of the pipe;
(3) mounting rotatable drilling and burnishing tools in axially adjacent alignment in said access chamber for movement as a single unit axially therethrough;
(4) providing said burnishing tool with a frustoconical outer surface finishing portion;
(5) advancing said drilling and burnishing tools as a single unit to cut a generally cylindrical hole radially through the pipe and to cause the frustoconical portion of said burnishing tool to engage and finish the surface of said cylindrical hole to conform to said frustoconical surface;
(6) holding said burnishing tool in said finished hole to sealingly engage the surface thereof and to block flow through the pipe; and,
(7) retracting said burnishing tool to reopen the pipe to flow.

17. A method for accessing, plugging and subsequently reopening a flowing oil well of the type wherein a central production pipe is enclosed below the ground surface in a tubular outer casing, said method comprising the steps of:
(1) providing access to the casing and exposing a full circumferential section for the casing;
(2) removing an exposed cylindrical section of the casing;
(3) attaching a tubular cylindrical saddle around and enclosing said pipe section;
(4) providing said saddle with an access chamber extending radially away from the outer wall of the pipe;
(5) mounting drilling and burnishing tools in axially adjacent alignment in said access chamber for movement as a single unit axially therethrough;
(6) providing said burnishing tool with an outer surface finishing portion;
(7) advancing said drilling and burnishing tools as a single unit to cut a generally cylindrical hole radially through the pipe and to cause the surface finishing portion of said burnishing tool to engage and finish the surface of said cylindrical hole to conform to said surface finishing portion;
(8) holding said burnishing tool in said hole to sealingly engage the finished surface thereof and to block flow through the pipe; and,
(9) retracting said burnishing tool to reopen the pipe to flow.

* * * * *